United States Patent
Hermann et al.

(10) Patent No.: US 10,670,152 B2
(45) Date of Patent: Jun. 2, 2020

(54) SHUT-OFF VALVE

(71) Applicant: Bitzer Kuehlmaschinenbau GmbH, Sindelfingen (DE)

(72) Inventors: Frank Hermann, Rositz (DE); Lucas Mikesch, Schmölln (DE)

(73) Assignee: BITZER Kuehlmaschinenbau GmbH, Sindelfingen (DE)

( * ) Notice: Subject to any disclaimer, the term of this patent is extended or adjusted under 35 U.S.C. 154(b) by 171 days.

(21) Appl. No.: 14/523,288

(22) Filed: Oct. 24, 2014

(65) Prior Publication Data

US 2015/0041697 A1 Feb. 12, 2015

Related U.S. Application Data

(63) Continuation of application No. PCT/EP2013/057838, filed on Apr. 15, 2013.

(30) Foreign Application Priority Data

Apr. 25, 2012 (DE) .......................... 10 2012 103 641

(51) Int. Cl.
*F16K 1/04* (2006.01)
*F16K 1/46* (2006.01)
*F16K 1/38* (2006.01)

(52) U.S. Cl.
CPC .................. *F16K 1/04* (2013.01); *F16K 1/38* (2013.01); *F16K 1/46* (2013.01)

(58) Field of Classification Search
CPC ..................................... F16K 1/38; F16K 1/04
USPC ......................................................... 251/264
See application file for complete search history.

(56) References Cited

U.S. PATENT DOCUMENTS

| 51,221 A | 11/1865 | Ricker | |
|---|---|---|---|
| 156,877 A | * 11/1874 | Chinnock | B67D 3/043 222/509 |
| 590,988 A | * 10/1897 | Hughes | E03B 9/04 137/290 |
| 1,293,976 A | * 2/1919 | Taylor | F16K 1/482 251/225 |
| 1,686,849 A | 10/1928 | Frauenheim | |

(Continued)

FOREIGN PATENT DOCUMENTS

| DE | 29919332 U1 * 3/2000 ............... F16K 1/48 |
|---|---|
| EP | 0 464 915 B1    1/1992 |

(Continued)

OTHER PUBLICATIONS

Hildebrand, Siegfried: Feinmechanische Bauelemente, 3rd edition, Muenchen, Wien: Hanser, 1978, p. 234-237.

*Primary Examiner* — Angelisa L. Hicks
(74) *Attorney, Agent, or Firm* — Reinhart Boerner Van Deuren

(57) ABSTRACT

In order to provide a shut-off valve including a valve housing, a valve seat which is held on the valve housing, and a valve element (40) which is movable in the valve housing relative to the valve seat and is movable by means of an adjusting unit, wherein the shut-off valve, as a result of its construction, has the smallest possible flow resistance in the open position of the valve element, it is proposed that the valve element should have a valve disc (74) which is provided, on its side facing the valve seat, with a sealing element (90) that abuts against the valve disc.

11 Claims, 4 Drawing Sheets

(56) References Cited

U.S. PATENT DOCUMENTS

| | | | |
|---|---|---|---|
| 2,311,009 A * | 2/1943 | Urquhart | F16K 1/46 |
| | | | 251/332 |
| 2,364,107 A | 12/1944 | Svirsky | |
| 2,457,492 A * | 12/1948 | Raybould | F16K 1/46 |
| | | | 251/332 |
| 2,643,849 A | 6/1953 | Davis | |
| 2,985,424 A | 5/1961 | Anderson et al. | |
| 3,412,751 A | 11/1968 | Hanson et al. | |
| 4,249,717 A * | 2/1981 | Thompson | F16K 25/00 |
| | | | 251/210 |
| 6,637,726 B1 | 10/2003 | Yamamoto | |
| 2009/0173905 A1 | 7/2009 | Boesch et al. | |

FOREIGN PATENT DOCUMENTS

| | | |
|---|---|---|
| EP | 1 240 450 B1 | 9/2002 |
| EP | 2423546 A2 | 2/2012 |
| GB | 1113982 A | 5/1968 |
| GB | 1321149 A | 6/1973 |
| JP | 08-109972 A | 4/1996 |
| WO | WO 2010/027627 A1 | 3/2010 |
| WO | WO 2011/056093 A1 | 5/2011 |

\* cited by examiner

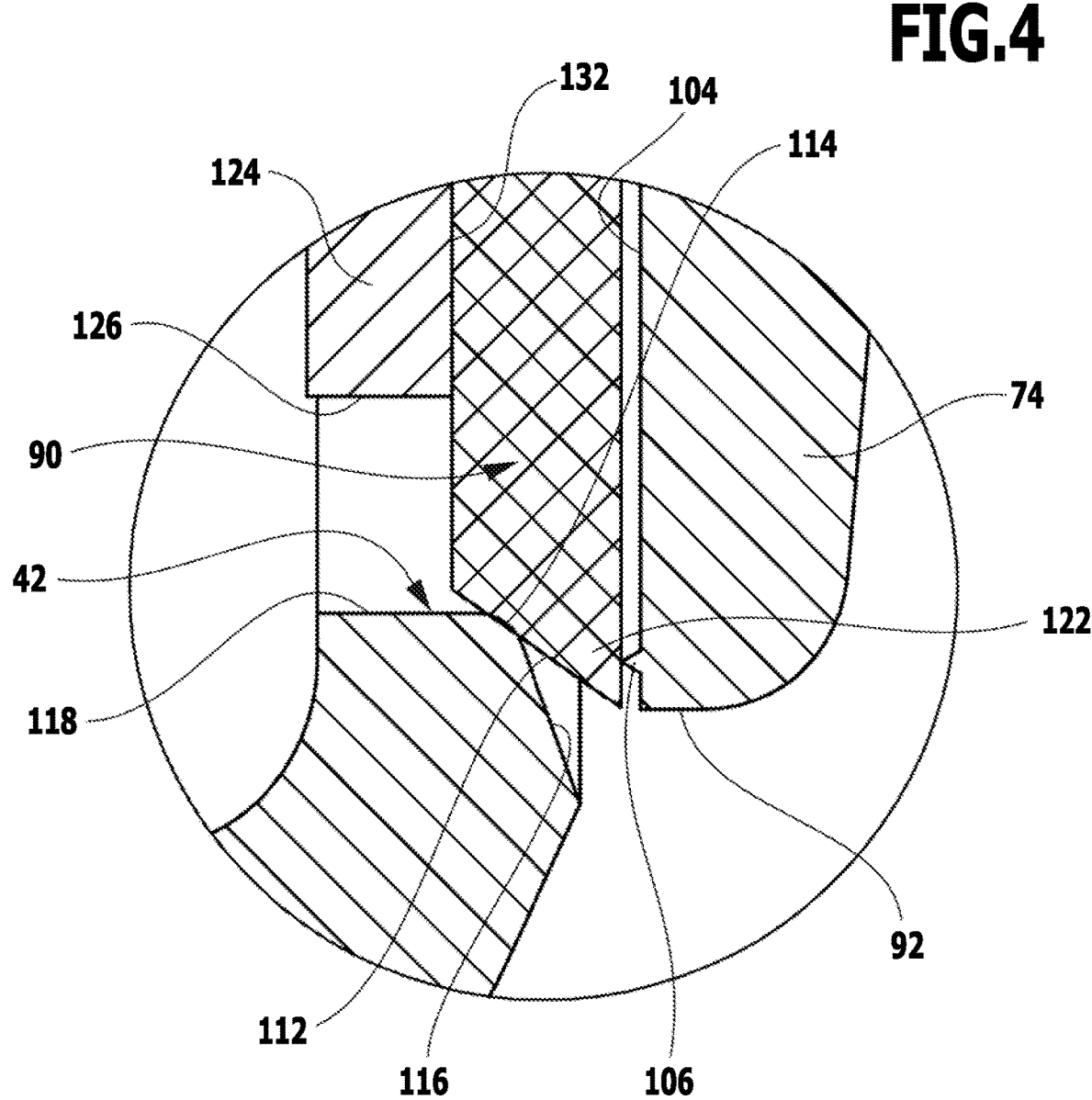

SHUT-OFF VALVE

CROSS REFERENCE TO RELATED PATENT APPLICATION

This application is a continuation of international application No. PCT/EP2013/057838 filed on Apr. 15, 2013.

This patent application claims the benefit of international application No. PCT/EP2013/057838 of Apr. 15, 2013 and German application number 10 2012 103 641.1 of Apr. 25, 2012, the teachings and disclosure of which are hereby incorporated in their entirety by reference thereto.

BACKGROUND OF THE INVENTION

The invention relates to a shut-off valve including a valve housing, a valve seat which is held on the valve housing, and a valve element which is movable in the valve housing relative to the valve seat and is movable by means of an adjusting unit.

Shut-off valves of this kind are known from the prior art.

These shut-off valves have the problem that the shut-off valve has an undesirable flow resistance in the open position of the valve element.

The object of the invention is therefore to provide a shut-off valve which, as a result of its construction, has the smallest possible flow resistance in the open position of the valve element.

SUMMARY OF THE INVENTION

This object is achieved according to the invention in the case of a shut-off valve of the type described in the introduction in that the valve element has a valve disc which is provided, on its side facing the valve seat, with a sealing element that abuts against the valve disc.

The advantage of this solution can be seen in the fact that it provides the possibility of forming the valve element in a manner favourable to flow and hence of obtaining a smaller flow resistance in the open position of the valve element.

In this arrangement, the valve element could still be rotatably connected to the adjusting unit, for which purpose a rotary connection is usually provided.

It is particularly favourable if the valve element is connected to the adjusting unit such that it cannot rotate in relation thereto.

This solution has the great advantage that as a result the rotary guide for connecting the valve element and the adjusting unit is dispensed with and thus a construction of the shut-off valve which is more favourable to flow is possible.

It is particularly favourable in this arrangement if the valve element has a hub body which is connected to the adjusting unit.

A simple connection which is favourable to flow may be made between the valve element and the adjusting unit by way of a hub body of this kind.

In particular, in this arrangement it is favourable if the hub body forms a central portion of the valve element which carries the valve disc and which, as a result of the type of construction, can be formed in a manner which is very favourable to flow.

The adjusting unit could in principle be formed in any desired manner, for example as a linear drive.

In particular, it is advantageously provided for the adjusting unit to include an actuating spindle which is arranged to be rotatable and axially adjustable in a receptacle in the valve housing.

An adjusting spindle of this kind makes movement of the valve element implementable in a simple manner.

One implementation provides for the valve element to be connected to the actuating spindle such that it cannot rotate in relation thereto, such that the connection between the valve element and the actuating spindle can be implemented in a simple manner that is favourable to flow.

In this arrangement, it is particularly favourable if the hub body is connected to the actuating spindle, in particular being integrally formed thereon, such that a direct connection between the actuating spindle and the valve element is implementable in the form of the hub body.

A further advantageous solution provides for the valve element to carry, on its side of the sealing element opposite to the valve disc, a holding disc which urges the sealing element in the direction of the valve disc.

As a supplement to the valve disc, a holding disc of this kind has the advantage that it allows the valve element to be formed in a manner favourable to flow and the sealing element to be fixed reliably between the holding disc and the valve disc.

Favourably, for this purpose it is provided for the holding disc to be urged in the direction of the valve disc by a holding body, as a result of which the holding disc is connectable to the valve disc in a simple manner.

In this arrangement, the holding body could be connectable to the valve disc in a different way.

A particularly favourable solution for this purpose provides for the holding body to be screwable into the hub body.

A screw connection of this kind between the holding body and the hub body can be implemented in a particularly simple and reliable manner.

In order to secure the connection between the hub body and the holding body against being released, it is preferably provided for a connection between the holding body and the hub body to be lockable by a locking element.

A locking element of this kind may be formed in an extremely wide range of different ways.

For example, one locking element of this kind is formed as a clamping pin which is seated in a bore that extends in both the holding body and the hub body.

For example, this bore could be a transverse bore which extends for example transversely in relation to a spindle axis of the actuating spindle.

A particularly favourable solution provides for the bore to be a bore that extends in both the holding body and the hub body, preferably parallel to the spindle axis of the actuating spindle.

In order to provide a reliable seal between the valve disc and the sealing element, it is preferably provided for the valve disc to have on its side facing the sealing element an elevated region that is arranged to run peripherally and in closed manner or to circulate in closed manner and against which the sealing element abuts.

This elevated region is for example formed such that when the sealing element is urged in the direction of the valve disc it digs into the sealing element and thus forms a line-like sealing line provided with a powerful sealing pressure, between the sealing element and the valve disc.

In order furthermore to achieve optimum closure of the shut-off valve in the closed position, it is preferably provided for the sealing element to have a conically peripheral outer surface by means of which the sealing element is abuttable against the valve seat.

A sealing element that is formed in this manner, with an outer surface that runs conically in relation to the spindle axis of the actuating spindle, enables a good sealing action to be achieved in the region of the valve seat, in a simple manner.

In particular, the sealing action of the sealing element in interaction with the valve seat can be improved in that the valve seat has a rounded transitional surface against which the outer surface is abuttable.

Preferably, in this arrangement the valve seat is formed such that it has an intake wall, which is in particular conical, and an outtake wall, which is in particular conical or cylindrical, and such that the transitional surface creates a transition from the intake wall to the outtake wall and hence provides the possibility of achieving a sufficiently powerful sealing pressure in the region of the valve seat between the outer surface and the transitional surface.

Further features and advantages of the invention form the subject-matter of the description that follows and the illustrative drawing of an exemplary embodiment.

BRIEF DESCRIPTION OF THE DRAWINGS

FIG. 4 shows an enlarged illustration of the section in FIG. 3 in a region A in FIG. 3.

DETAILED DESCRIPTION OF THE INVENTION

Figure 1:
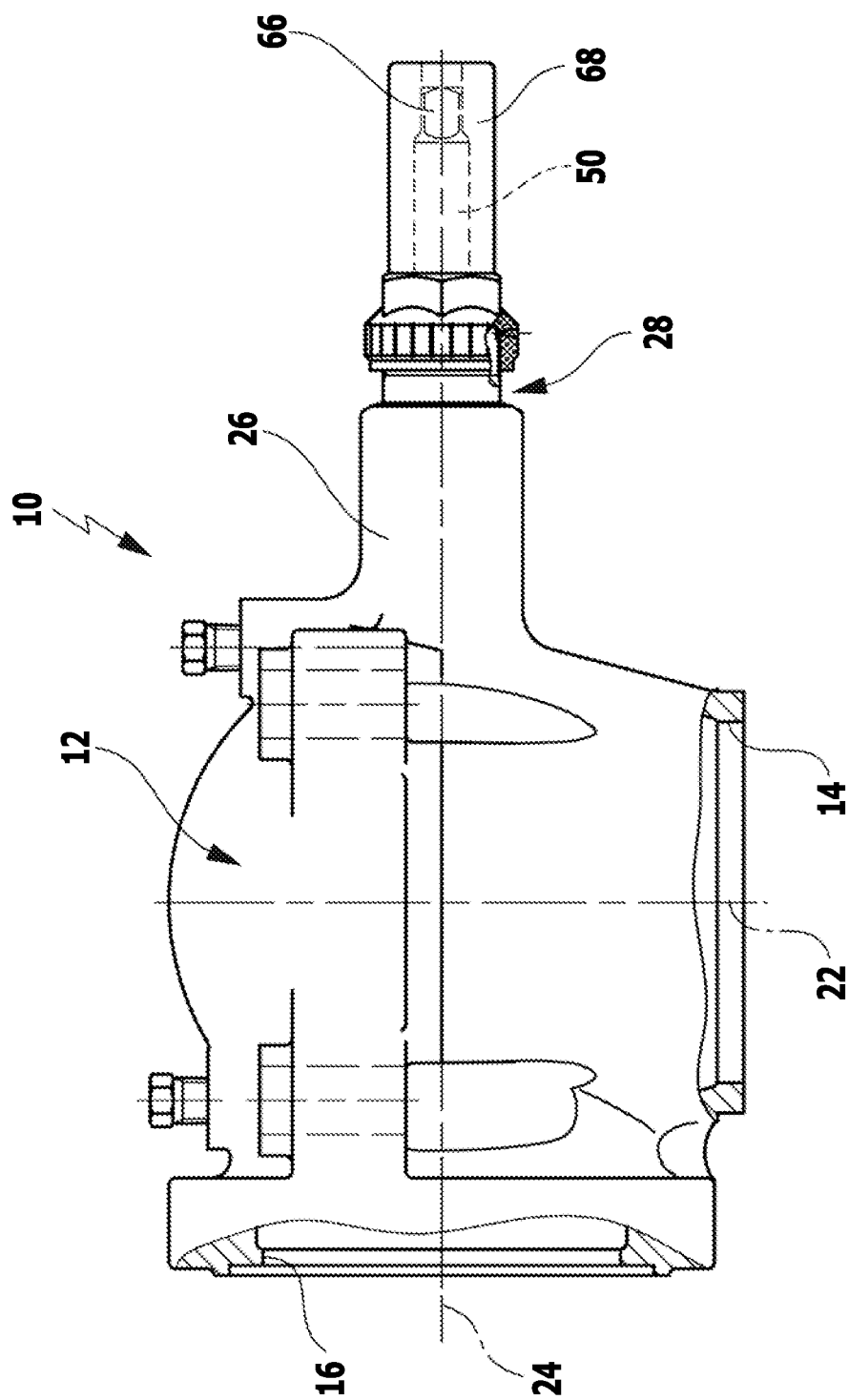
FIG. 1 shows a side view of a shut-off valve according to the invention.

An exemplary embodiment of a shut-off valve 10 according to the invention, illustrated in FIG. 1, includes a valve housing 12 which has an intake 14 and an outtake 16, wherein for example a centre axis 22 of the intake 14 is oriented transversely, preferably at a right angle, to a centre axis 24 of the outtake 16.

Further, on an opposite side to the outtake 16, the valve housing includes a receptacle 26 for an adjusting unit that is designated 28 as a whole and whereof the operation will be explained in detail below.

Figure 2:
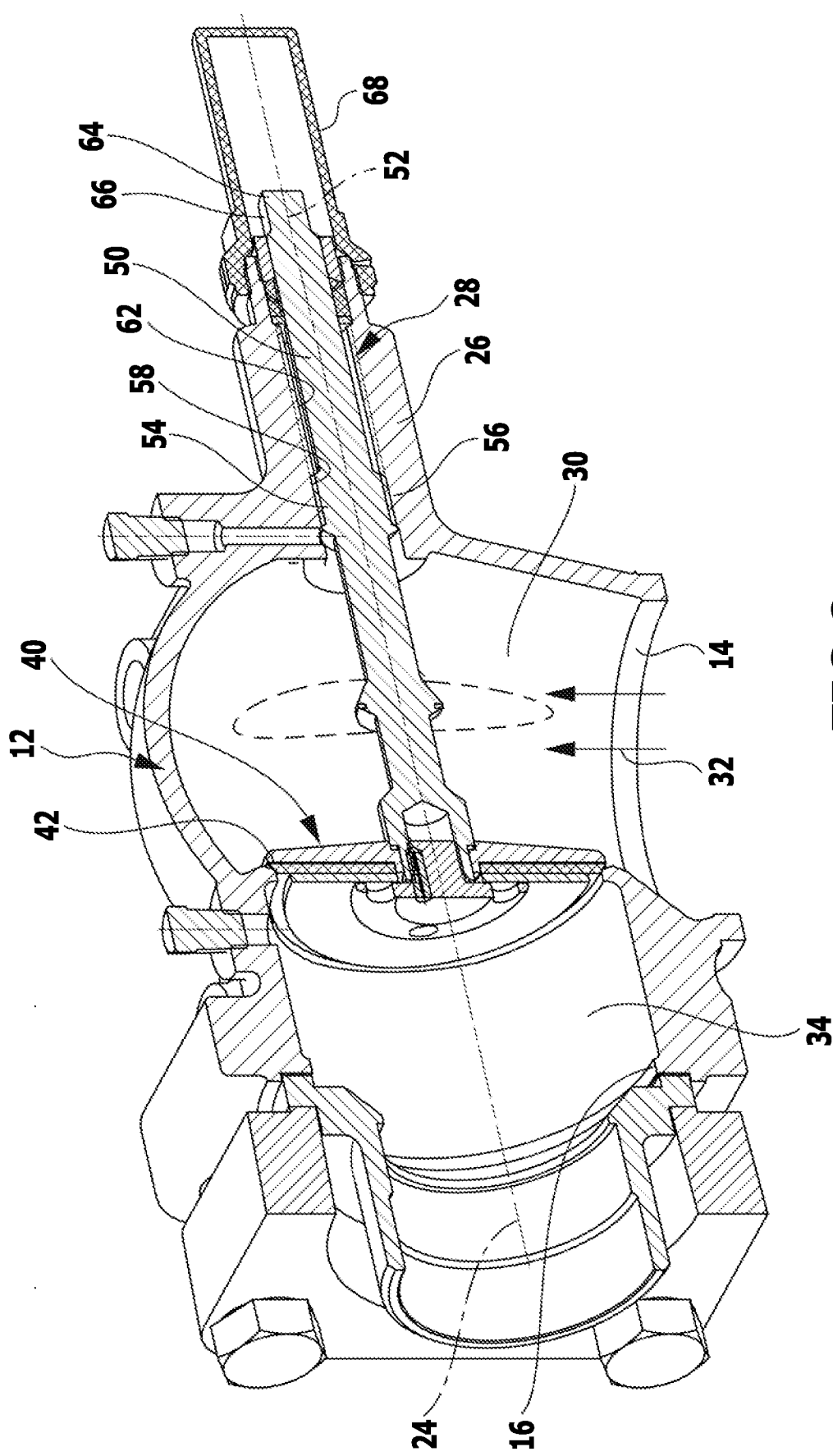
FIG. 2 shows a longitudinal section through the shut-off valve illustrated in FIG. 1.

As illustrated in FIG. 2, in the valve housing 12 an intake chamber 30 is formed adjoining the intake 14, and receives a medium 32 that flows in through the intake 14 and is deflected in the valve housing 12 in the direction of an outtake chamber 34 adjoined by the outtake 16.

However, the inflowing medium 32 may be prevented from passing into the outtake chamber 34 by a valve element, designated 40 as a whole, which is movable by means of the adjusting unit 28 in relation to a valve seat 42 that is arranged in the valve housing 12 at the transition from the intake chamber 30 to the outtake chamber 34, being movable from a closed position in which there is interaction with the valve seat 42 and which is shown in solid lines in FIG. 2 to an open position which is indicated by dashed lines in FIG. 2, and vice versa.

In this arrangement, in the open position the valve element 40 is approximately in the centre of the intake chamber 30, such that the centre axis 22 intersects the valve element 40 in the open position.

Further, the valve element 40 is preferably movable parallel to the centre axis 24 of the outtake 16, in particular coaxially in relation to the centre axis 24.

Preferably, the valve seat 42 is also arranged coaxially in relation the centre axis 24 of the outtake 16.

The adjusting unit 28, which enables movement of the valve element 40 parallel to the centre axis 24 of the outtake 16, preferably—as illustrated in FIG. 2—includes an actuating spindle 50 which is rotatable about a spindle axis 52 and is provided in the region of a threaded portion 54 with an external thread 56 which, for its part, engages in an internal thread 58 which is provided in a threaded bore 62 in the receptacle 26, wherein the threaded bore 62 has a length in the direction of the spindle axis 52 that is sufficiently large for the threaded portion 54 to be held and guided in the threaded bore 62 both in the closed position and in the open position of the valve element 40.

Further, the actuating spindle is provided, in the region of its end 64 that extends beyond the receptacle 26 and thus projects out of the latter, with a positively locking element 66, for example a square shaft, which enables the actuating spindle 52 to be driven using a suitable drive element.

Preferably, for covering the end 64 of the actuating spindle 50 there is also provided a covering cap 68 which is screwable onto the receptacle 26 in the valve housing 12 and at the same time is capable of receiving the end 64 of the actuating spindle 54 in any position of the valve element 40.

Figure 3:
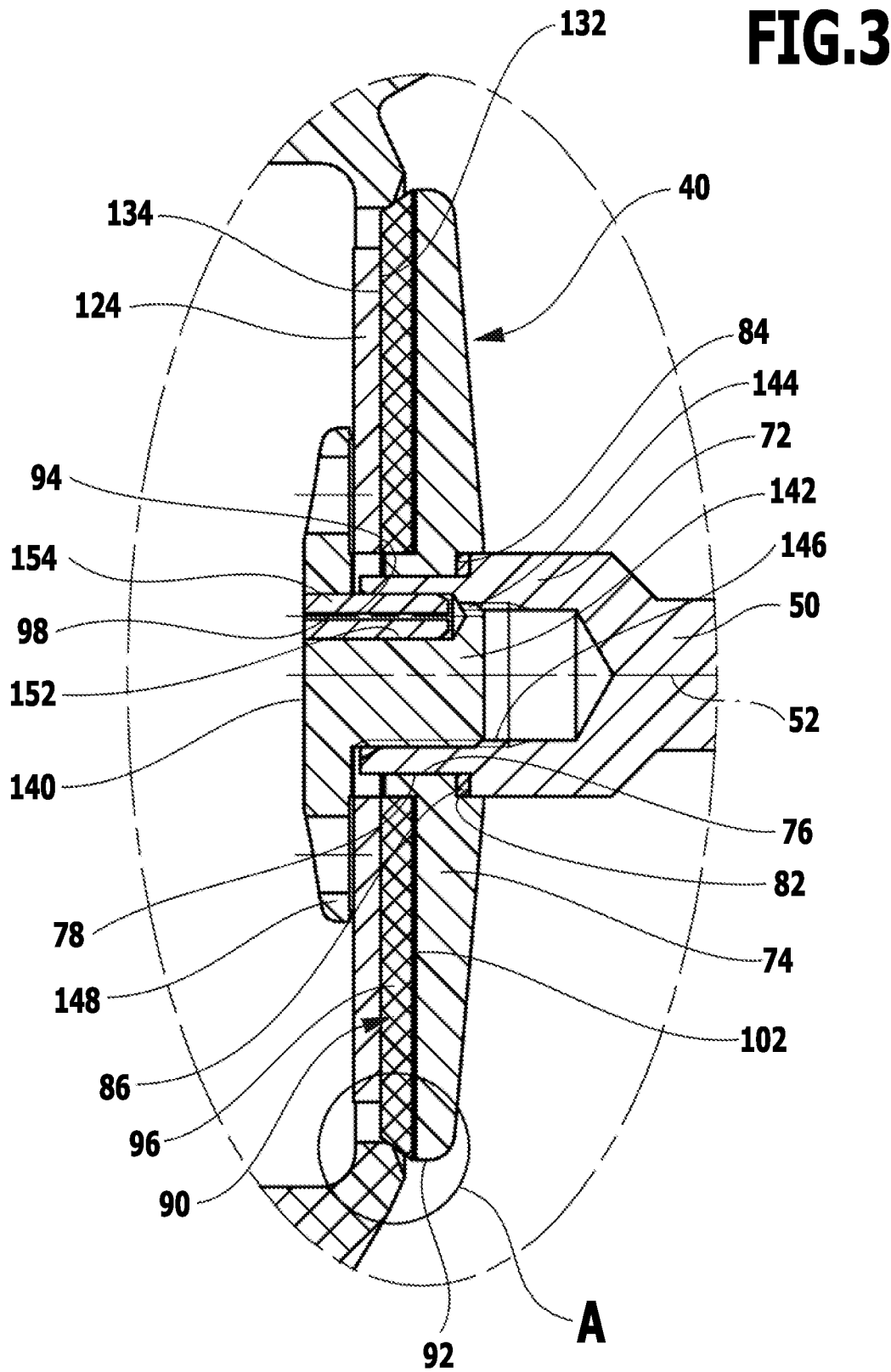
FIG. 3 shows an enlarged illustration of the section in FIG. 2 in the region of the valve element.

As illustrated in FIG. 3, the valve element 40 is held on a hub body 72, in particular a hub sleeve of the actuating spindle 50, which is preferably integrally formed in one piece with the actuating spindle 50 and represents an end of the actuating spindle 50 that is located in the intake chamber 30.

In this arrangement, the valve element 40 is formed by a valve disc 74 which is provided with a central aperture 76, which for its part is seated on a cylindrical guide surface of the hub sleeve 72 and is supported against a shoulder 82 of the hub sleeve 72, this shoulder 82 extending radially beyond the cylindrical guide surface 78, wherein there is provided, between the shoulder 82 and a support surface 84 of the valve disc that faces it, a seal 86 which results in a peripherally sealed closure between the hub sleeve 72 and the valve disc 74.

On its side facing the valve seat 42, the valve disc 74 carries a sealing element 90 which extends from an outer peripheral side 92 of the valve disc 74, which lies radially outward in relation to the spindle axis 52, to a centring attachment 94 of the valve disc 74 and is formed for example as a washer which has a centring cutout 98 that abuts against the centring attachment 94.

In this arrangement, the sealing element 90 that is formed as a washer 96 is supported against the valve disc 74 by way of a supporting side 102 that faces the valve disc 74.

In this arrangement, the valve disc 74 is preferably provided—as illustrated in FIG. 4—in the region close to its outer peripheral side 92 with an annular elevated region 106 that projects annularly beyond an abutment side 104 of the valve disc 74 and in particular runs peripherally and in closed manner around the spindle axis 52, and against which the sealing element 90 is abuttable in such a way that the elevated region 106 can dig into the material of the sealing element 90 and results in a sealed closure between the valve disc 74 and the sealing element 90, such that no medium can pass between the valve disc 74 and the sealing element 90 and be propagated in the direction of the centring attachment 94 and the centring cutout 98.

Rather, as a result of the annular elevated portion 106, because of a sealing line which is formed, a sealed closure between the valve disc 74 and the sealing element 90 is ensured.

For sealing in the region of the valve seat 42, the sealing element 90 is provided with a radially outward outer surface 112 which runs conically in relation to the spindle axis 52, wherein the cone angle of the outer surface 112 is in the range between 45° and 80°, preferably in the range between 50° and 70°.

For the purpose of sealed closure with the valve seat 42, this conical outer surface 112 is abuttable against a transitional surface 114 of the valve seat 42 which is rounded in cross section, wherein the transitional surface 114 is located between an intake wall 116, which runs conically in relation to the spindle axis 52 and faces the intake chamber 30, and an outtake wall 118 of the valve seat 42, which runs approximately cylindrically in relation to the spindle axis 52. In this arrangement, the cone angle of the intake wall 116 is larger than the cone angle of the outer surface 112 of the sealing element 90, with the result that, close to the transition to its closed position, the sealing element 90 abuts by means of the outer surface 112 initially linearly against the transitional surface 114, but because of the radius of the transitional surface 114 the latter digs at least partly into the outer surface 112 of the sealing element 90 in order to ensure a sealed closure between the transitional surface 114 and the sealing element 90, in particular the outer surface 112 of the latter.

Preferably, the radius of the elevated region 106 that runs peripherally and in closed manner around the spindle axis 52 is larger than a radius of the transitional surface 114, with the result that in the region of the elevated region 106 optimum pressure may be produced between the latter and the sealing element 90, in particular between an outer region 122 of the sealing element 90 or washer 96 that projects beyond the transitional surface 114.

In this arrangement, preferably the cone angle of the intake wall 116 is larger, preferably significantly larger, than the cone angle of the outer surface 112, preferably lying in the range between 80° and 90°.

For fixing the washer 96 of the sealing element 90 to the valve disc 74, a holding disc 124 is provided on an opposite side of the sealing element 90 to the valve disc 74 and substantially covers the washer 96 of the sealing element 90 in the radial direction relative to the spindle axis 52 but extends at a spacing from the outer surface 112 of the sealing element 90, this spacing ensuring that the holding disc 124 having an outer side 126 that is radially outward in relation to the spindle axis 52 cannot collide with the valve seat 42.

Preferably, the outer side 126 of the holding disc 124 is at a radial spacing from the spindle axis 52 which is smaller than the radius of the outtake wall 118, and preferably the radius is at most 95% of the radius of the outtake wall 118.

Favourably, in this arrangement, by means of a pressure surface 132 the holding disc 124 abuts against substantially the entire face of an abutment surface 134 of the sealing element 90, in particular the washer 96, facing the pressure surface 132 and urges the sealing element 90, in particular the washer 96, in the direction of the abutment side 104 of the valve disc 74.

For fixing the holding disc 124 in relation to the valve disc 74, and for clamping the sealing element 90 between the holding disc 124 and the valve disc 74, there is provided a holding body 140 which is screwed by means of a threaded attachment 142 that is provided with an external thread 144 into an internal thread 146 of the hub sleeve 72.

Further, the holding body 140 includes a flange body 148 that is connected to the threaded attachment 142 and, in a radially outward region that runs around the threaded attachment 142, urges the holding disc 124, in order to use the latter for its part to urge the sealing element 90 in the direction of the valve disc 74.

Further, the holding body is fixable relative to the hub sleeve 72 in its position that fixes the sealing element 90 with positively engaging clamping between the holding disc 124 and the valve disc 74, by a bore 152 that engages in the external thread 144 and the internal thread 146, running in particular parallel to the spindle axis 52, and into which a clamping pin 154 is insertable, this clamping pin 154—once it is seated in the bore 152—preventing the external thread 144 from turning relative to the internal thread 146 and thus preventing the threaded attachment 172 from turning relative to the hub sleeve 72.

Operation of the shut-off valve according to the invention is such that, as a result of the adjusting unit 28, the entire valve element 40 can be moved relative to the valve seat 42, wherein in its closed position the sealing element 90 abuts by means of its conical outer surface 112 against the transitional surface 114 and during this is pressed so powerfully against the transitional surface 114 that the latter deforms the outer surface 112 such that it abuts against the transitional surface 114.

This is done by rotating the actuating spindle 50, wherein the valve disc 74 and the sealing element 90 and the holding disc 124 rotate with the actuating spindle 50 such that in the course of a rotary movement the outer surface 112 of the sealing element 90 comes into abutment against the transitional surface 114.

If the valve element 40 is to be moved from the closed position described above into the open position, then again a rotation of the actuating spindle 50 is performed but in the opposite direction, such that in the course of a rotary movement the sealing element 90 is released by means of the outer surface 112 from the transitional surface 114.

In this arrangement, in the event of the valve element 40 being in the closed position for a long time, the sealing element 90 may adhere to the transitional surface 114 by means of the outer surface 112 such that when the valve element 40 makes the transition from the closed position to the open position a rotary movement of the sealing element 90 is inhibited.

In this case, despite the positive engagement with the valve disc 74 and the holding disc 124, for a brief time the sealing element 90 cannot turn with the valve disc 74, with the result that on the one hand it is possible to rotate the actuating spindle 50 to raise the valve element 40 away from the valve seat 42 and on the other the sealing element 90 may remain stationary for a brief time such that it cannot rotate in relation to the valve seat 42, in particular in relation to the transitional surface 114, until the valve disc 74, together with the holding disc 124, has moved somewhat away from the valve seat 42, with the result that in this case too adhesion of the outer surface 112 to the transitional surface 114 may be released by the movement in the direction of the spindle axis 52 away from the valve seat 42, and then the valve disc 74 may rotate with the actuating spindle 50 once again.

The invention claimed is:

1. A shut-off valve including a valve housing, a valve seat which is held on the valve housing, and a valve element which is movable in the valve housing relative to the valve seat and is movable by means of an adjusting unit, wherein the valve element has a valve disc which is provided, on its side facing the valve seat, with a sealing element that abuts against the valve disc, the valve disc having, on a side facing the sealing element, an elevated region that is arranged to circulate in a closed manner and against which the sealing element abuts, the elevated region being formed such that, when the sealing element is urged in the direction of the valve disc, it digs into the sealing element, the valve seat having an intake wall and an outtake wall and a transitional surface rounded in cross-section creating a transition from the intake wall to the outtake wall, the sealing element having a conical outer surface by means of which the sealing element is abuttable along a line of contact against the rounded transitional surface forming the valve seat;

and wherein a radius of the elevated region, that runs peripherally and in a closed manner around a spindle axis, is larger than the radius of the transitional surface.

2. A shut-off valve according to claim 1, wherein the valve element is connected to the adjusting unit such that it cannot rotate in relation thereto.

3. A shut-off valve according to claim 2, wherein the valve element has a hub body which is connected to the adjusting unit.

4. A shut-off valve according to claim 3, wherein the hub body forms a central portion of the valve element which carries the valve disc.

5. A shut-off valve according to claim 1, wherein the adjusting unit includes an actuating spindle which is arranged to be rotatable and axially adjustable in a receptacle of the valve housing.

6. A shut-off valve according to claim 5, wherein the valve element is connected to the actuating spindle such that it cannot rotate in relation thereto.

7. A shut-off valve according to claim 5, wherein a hub body is connected to the actuating spindle.

8. A shut-off valve according to claim 1, wherein the valve element carries, on its side of the sealing element opposite to the valve disc, a holding disc which urges the sealing element in the direction of the valve disc.

9. A shut-off valve according to claim 8, wherein the holding disc is urged in the direction of the valve disc by a holding body.

10. A shut-off valve according to claim 9, wherein the holding body is screwable into the hub body.

11. A shut-off valve according to claim 9, wherein a connection between the holding body and the hub body is lockable by a locking element.

* * * * *